3,793,273
ANION EXCHANGE RESINS WITH BOTH AMINE OXIDE AND QUATERNARY AMMONIUM GROUPS
Herbert Corte, Opladen, and Harold Heller and Otto Netz, Cologne, Germany, assignors to Bayer Aktiengesellschaft, Leverkusen, Germany
No Drawing. Filed Aug. 16, 1971, Ser. No. 172,249
Claims priority, application Germany, Aug. 8, 1970, P 20 39 495.0; Oct. 9, 1970, P 20 49 690.6
Int. Cl. C08f 27/22
U.S. Cl. 260—2.1 E          6 Claims

ABSTRACT OF THE DISCLOSURE

Weakly basic anion exchange resins having amine-oxide groups and a method for producing such resins by oxidizing tertiary amino groups containing anion exchange resins.

---

This invention relates to weakly basic anion exchangers having amide-oxide groups, to a process for their production, and to their application.

Conventional weakly basic ion exchangers comprising a crosslinked resin matrix (for example a styrene/divinyl benzene copolymer) and having primary, secondary or tertiary amino groups as the ion-exchanging function, often undergo a considerable change in volume during transformation from the base form into the salt form, i.e. during charging or during regeneration. This has various disadvantages:

(1) Damage of the ion-exchanger grains is often caused by swelling and shrinkage of the material.
(2) The flow resistance of a layer of ion exchanger, to a liquid flowing through it, changes constantly depending upon the charge.

It has been found that weakly basic ion exchangers containing amine-oxide groups and, optionally, quaternary ammonium groups do not have any of these disadvantages. The exchangers according to the invention are obtained by treating an anion exchanger having tertiary amino groups with an oxidizing agent which is able to convert tertiary amino groups into amine-oxide groups. Weakly basic anion exchangers comprising a resin matrix to which exchange-active tertiary amino groups are attached, are particularly suitable for carrying out this process. Compounds having one or more O—O—H groups are preferred oxidizing agents.

Examples of oxidizing agents suitable for carrying out the process include hydrogen peroxide; organic peroxy acids such as peracetic acid or perbenzoic acid; and inorganic peroxy acids such as peroxy monosulphuric acid. For conversion into amine-oxides, the tertiary amines have to be in the form of free bases. If the starting material is in the salt form, it should either be converted into the free base before oxidation or, alternatively, alkali should be added during oxidation.

To carry out the process according to the invention, the weakly basic anion exchanger can initially be suspended in a solvent and then reacted with the oxidizing agent with intensive stirring at a temperature of from preferably —10 to +100° C., most preferably at a temperature of from 0 to 70° C. Water is particularly suitable for use as the solvent.

The reaction temperature is generally governed by the stability of the ion exchanger with respect to the oxidizing agent. Exchangers that are relatively stable to oxidation can be reacted at a relatively high temperature, thus considerably shortening the reaction time.

The quantity in which the oxidizing agent is used is determined by the effect required. The oxidizing agent is preferably used in a quantity of from 0.1 to 10 mols per mol of amino group in the exchanger. When less than 1 mol of oxidizing agent is used per mol of amino group, the amino groups are only partly converted into amine-oxide groups. In some instances, this in itself is sufficient to reduce considerably the changes in volume which occur during charging and regeneration of the exchangers. The optimal effect is obtained when substantially all the tertiary amino groups present are converted into amine-oxide groups. A slight stoichiometric excess of the oxidizing agent, for example 1.1 to 2 mols per mol of tertiary amino groups, is usually sufficient for this purpose. It is, however, also possible to employ a larger excess of the oxidizing agent.

Exchangers which contain quaternary ammonium groups in addition to the amine-oxide groups are of particular advantage for industrial applications. These quaternary ammonium groups can either be already present in the starting material or, alternatively, can be produced after the oxidation step by alkylating remaining tertiary amino groups by means of alkylating agents, for example alkyl halides or dialkyl sulphates. When the quaternary groups are to be produced after completion of oxidation, only part of the tertiary amino groups can be oxidized. This can be effected in various ways e.g. by applying the oxidizing agent in such a quantity that not all the tertiary amino groups are oxidized; alternatively, an excess of oxidizing agent can be used, with premature termination of the reaction; or a starting material partially in the salt form can be used, with consequent incomplete oxidation. The non-oxidized amino groups can then be quaternized by methods known per se. The exchangers preferably contain more amine-oxide groups than quaternary ammonium groups.

The anion exchanges oxidize in accordance with the invention retain their exchange activity but undergo hardly any changes in volume during charging (with acids) and during regeneration (with bases). Accordingly, they do not have the disadvantages of conventional weakly basic exchangers, i.e. the starting materials.

In addition, it has been found that exchangers which, apart from small numbers of quaternary ammonium groups, contain almost exclusively N-oxide groups, are particularly suitable for processing solutions containing peroxydisulphate. The problem of removing peroxydisulphate from aqueous solution is encountered, for example, in the purification of water from galvanic processes. The procedure normally adopted for this is to replace the cations by H-ions, using a cation exchanger, after which the anions, now existing as free acids, are removed by weakly basic anion exchangers.

In the presence of peroxydisulphate, however, this process involves problems because the conventional weakly basic anion exchangers are not resistant against peroxydisulphuric acid. This decomposition causes a decrease in capacity and a marked increase in the consumption of washing water after regeneration.

Surprisingly, it has been found that though ion exchangers containing tertiary amino groups are not stable under the aforementioned conditions, they are stable after the oxidation reaction according to the invention.

For example, the starting material of Example 3 lost 50% of its ion exchange capacity for acids after being charged and regenerated 10 times with an aqueous solution of peroxy-disulphuric acid (concentration 10 mval./l.) and with dilute sodium hydroxide solution, respectively, whilst its oxidation product lost less than 2% of its capacity after the same treatment.

The exchangers of Example 4 behaved similarly; after treatment 10 times with peroxydisulphuric acid (as described above), the starting material lost 20% of its ion exchange capacity for acids, whilst the oxidation product lost only just 3%.

In principle, any weakly basic anion exchanger which contains tertiary amino groups as exchange-active groups can be treated by the process according to the invention. Exchangers of this kind are known. They can be obtained, for example, by reacting a water-insoluble, crosslinked synthetic resin (matrix) with chloromethyl methyl ether (chloromethylation), followed by reaction with a secondary amine (cf. U.S. Pat. No. 2,629,710).

In this process, the matrix is generally a bead copolymer of a monovinyl aromatic compound and a crosslinking agent. The crosslinking agent is generally used in a quantity of from 1 to 50% by weight, preferably from 2 to 15% by weight, based on the monomer total. The aromatic monovinyl compound is preferably styrene, vinyl toluene, vinyl naphthalene or vinyl pyridine; preferred crosslinking agents include aromatic polyvinyl or polyvinylidene compounds such as divinyl benzene or trivinyl benzene, and aliphatic polyvinyl compounds such as ethylene glycol dimethacrylate. To prepare the ion exchanger from the chloromethylated matrix it is preferred to use dialkyl amines such as dimethylamine, diethylamine, dibutylamine and methylethylamine.

Another process for producing weakly basic anion exchangers suitable for use as starting material in the process according to the invention involves aminoethylation of a resin matrix followed by alkylation. In this process, alkylation is preferably carried out with formaldehyde and formic acid because tertiary amino groups are preferentially formed in this way.

It is also possible to nitrate a resin matrix, followed by reduction and then by alkylation (cf. French patent specification No. 1,211,485).

Another known method for producing the starting materials is to start with copolymers containing carboxylic acid ester groups and to react them with a primary diamine (cf. German patent specification No. 956,449). Copolymers of methyl acrylate, divinyl benzene and another crosslinking agent, for example trivinyl cyclohexane, are preferred starting materials for this process.

In all these processes, it is also possible to use a socalled macroporous resin as the starting material. Resins of this kind can be obtained, for example, by subjecting the starting monomers to suspension polymerization in the presence of an organic solvent which dissolves the monomers but which neither dissolves nor swells the copolymer formed. Matrices of this kind are also known, as is the production of anion exchangers therefrom (cf. German patent specification No. 1,045,102).

EXAMPLE 1

Following conversion into the free base form (with dilute sodium hydroxide solution), 2000 ml. of a macroporous weakly basic anion exchanger (prepared by aminomethylating a macroporous bead polymer of styrene crosslinked with 8% of divinyl benzene, followed by methylation with formaldehyde and formic acid) were suspended in 800 ml. of water and 2000 ml. of 30% $H_2O_2$ were gradually added to the resulting suspension while cooling with ice to a temperature below 10° C. After stirring for 15 hours at about 5 to 10° C., the reaction product was washed in a filter tube until the effluent contained no more $H_2O_2$.

2785 ml. of a weakly basic exchanger were obtained which, when charged to equilibrium with 0.1 n-hydrochloric acid, underwent an increase in volume of 5%, whilst the starting material showed an increase in volume of 50% under the same conditions.

EXAMPLE 2

2000 ml. of a macroporous weakly basic anion exchanger (prepared as described in Example 1 from a macroporous styrene bead polymer crosslinked with 6% of divinyl benzene) were treated with $H_2O_2$ as in Example 1. 2830 ml. of a weakly basic exchanger were formed which, after charging with 0.1 n-hydrochloric acid to equilibrium, underwent a reduction in volume of 1%, whilst the starting material showed an increase in volume of 40%, under the same conditions.

EXAMPLE 3

2000 ml. of a macroporous anion exchanger (which had been prepared from the starting anion exchanger of Example 2 by approximately 10% partial quaternization with methyl chloride) were dispersed in water and treated with 1500 ml. of 30% $H_2O_2$ at a temperature of 5° C., followed by stirring for 4 hours at the aforementioned temperature and then for 10 hours at 20 to 28° C. After excess $H_2O_2$ had been washed out, 2730 ml. of a weakly basic anion exchanger were obtained which, after charging to equilibrium with 0.1 n-hydrochloric acid, underwent a decrease in volume of 1%, whilst the partially quaternized starting material showed an increase in volume of 35% after the same treatment.

When 400 g. of 35% hydrogen peroxide were added over a period of 2 hours at 50 to 55° C. to 2000 ml. of the same exchanger in aqueous suspension, and the resulting mixture was held at 55° C. for another 3 hours, 2735 ml. of a weakly basic anion exchanger were obtained whose volume decreased by 2% as a result of charging to equilibrium with 0.1 n-hydrochloric acid.

When only 100 g. of 35% hydrogen peroxide were used instead of 400 g., under otherwise the same conditions, 2350 ml. of a weakly basic anion exchanger were obtained whose volume underwent an increase of 16% as a result of charging to equilibrium with 0.1 n-hydrochloric acid.

EXAMPLE 4

800 ml. of a weakly basic anion exchanger (which had been obtained by chloromethylating a macroporous styrene bead polymer crosslinked with 6% of divinyl benzene, followed by amination with diethylamine) were stirred in aqueous suspension at 2° C. with 1500 ml. of $H_2O_2$ (30%) and then, after the heat of reaction had abated, for another 10 hours at 15° C.

After the excess $H_2O_2$ had been washed out, 1100 ml. of an anion exchanger were obtained whose volume underwent a decrease of 2% after charging to equilibrium with 0.1 n-hydrochloric acid, whilst the starting material showed an increase in volume of 40% after the same treatment.

EXAMPLE 5

1000 ml. of a weakly basic anion exchanger (prepared by aminolysis of a macroporous methyl acrylate bead polymer crosslinked with 5% of divinyl benzene and 3% of trivinyl cyclohexane with N,N-dimethyl-1,3-propylene diamine) were suspended in 400 ml. of water, 800 ml. of $H_2O_2$ (30%) were added to the resulting suspension at 0 to 5° C., followed by stirring for 6 hours at 0 to 5° C, and then for 14 hours at 18 to 22° C. After the excess $H_2O_2$ had been washed out, the yield comprised 1185 ml. of anion exchanger resin.

This anion exchanger was found to have increased in volume by 3% after charging to equilibrium with 0.1 n-hydrochloric acid, whilst the starting resin increased in volume by 22% under the same conditions.

EXAMPLE 6

Following conversion into the free base form, 500 ml. of a weakly basic anion exchanger (prepared by aminomethylating a styrene bead polymer crosslinked with 6% of divinyl benzene followed by methylation with formaldehyde and formic acid) were suspended in 200 ml. of water, 200 g. of 35% hydrogen peroxide were added to the resulting suspension over a period of 2 hours at 50 to 55° C., after which the mixture was held at 50 to 55° C. for another 10 hours. After the reaction product had been washed with water until the peroxide reaction disappeared, 680 ml. of a weakly basic anion exchanger were obtained which did not show any change in volume after charging to equilibrium with 0.1 n-hydrochloric acid, whilst the starting material showed an increase in volume of 36% after the same treatment.

EXAMPLE 7

2000 ml. of the starting material of Example 6 were suspended in 800 ml. of water, and 450 g. of 35% hydrogen peroxide were added to the resulting suspension over a period of 2 hours at 55° C., after which the mixture was held at 50 to 55° C. for another 3 hours. After thorough washing with water until the peroxide reaction had disappeared, 2580 ml. of a weakly basic anion exchanger were obtained which still contained tertiary amino groups and hence showed an increase in volume of 4% after charging to equilibrium with 0.1 n-hydrochloric acid.

1000 ml. of this exchanger were treated with excess methyl chloride at 40° C. in aqueous suspension. After charging, the 1070 ml. of anion exchanger thus formed did not show any change in volume and contained up to 10% of quaternary groups.

We claim:

1. A weakly basic anion exchanger having a crosslinked polymeric matrix to which are linked amine-oxide groups and quaternary ammonium groups.

2. The anion exchanger of claim 1 wherein the matrix has a macroporous structure.

3. The anion exchanger of claim 1 wherein the matrix is a copolymer of a monovinyl aromatic compound and 2–15% by weight, based on total monomers, of a crosslinking agent.

4. The anion exchanger of claim 3 wherein the monovinyl aromatic compound is selected from the group consisting of styrene, vinyl toluene, vinyl naphthalene, and vinyl pyridine.

5. The anion exchanger of claim 3 wherein the crosslinking agent is selected from the group consisting of divinyl benzene, trivinyl benzene, and ethylene glycol dimethacrylate.

6. The anion exchanger of claim 1 wherein the matrix is a copolymer of a carboxylic acid ester.

References Cited

UNITED STATES PATENTS

| | | | |
|---|---|---|---|
| 3,749,684 | 7/1973 | Walker | 260—2.1 E |
| 2,862,894 | 12/1958 | Hwa | 260—2.1 |

FOREIGN PATENTS 754,452   2/1971   Belgium.

OTHER REFERENCES

Heller et al., J. Chem. Soc., 1963, 1579–82.

Marchisio et al., Medicino del Lavoro 59, 136–45 (1968).

MELVIN GOLDSTEIN, Primary Examiner